United States Patent
Wilhelmsson et al.

(10) Patent No.: US 9,860,929 B2
(45) Date of Patent: Jan. 2, 2018

(54) USER EQUIPMENT, A NETWORK NODE, AND METHODS FOR DEVICE DISCOVERY IN DEVICE TO-DEVICE (D2D) COMMUNICATIONS IN A WIRELESS TELECOMMUNICATIONS NETWORK

(71) Applicant: Telefonaktiebolaget L M Ericsson (publ), Stockholm (SE)

(72) Inventors: Leif Wilhelmsson, Dalby (SE); Stefan Parkvall, Bromma (SE); Gabor Fodor, Hässelby (SE); Göran N. Klang, Enskede (SE); Erik Dahlman, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 336 days.

(21) Appl. No.: 14/424,709

(22) PCT Filed: Sep. 18, 2012

(86) PCT No.: PCT/SE2012/050983
§ 371 (c)(1),
(2) Date: Feb. 27, 2015

(87) PCT Pub. No.: WO2014/046576
PCT Pub. Date: Mar. 27, 2014

(65) Prior Publication Data
US 2015/0237663 A1    Aug. 20, 2015

(51) Int. Cl.
*H04W 76/02* (2009.01)
*H04W 72/04* (2009.01)
*H04W 72/08* (2009.01)

(52) U.S. Cl.
CPC ..... *H04W 76/023* (2013.01); *H04W 72/0473* (2013.01); *H04W 72/085* (2013.01)

(58) Field of Classification Search
CPC ... H04W 84/18; H04W 4/005; H04W 76/023; H04W 52/325; H04W 52/383;
(Continued)

(56) References Cited

U.S. PATENT DOCUMENTS 7,039,445 B1 * 5/2006 Yoshizawa .......... H04M 1/7253
                                                        343/754
8,060,105 B2 * 11/2011 Jung .................... H04L 5/0037
                                                        370/278

(Continued)

FOREIGN PATENT DOCUMENTS

WO    2008034023 A1    3/2008
WO    2009138820 A1    11/2009
(Continued)

OTHER PUBLICATIONS

Non-Final Office Action for U.S. Appl. No. 14/408,200, dated Jan. 20, 2016, 36 pages.
(Continued)

*Primary Examiner* — Matthew Sams
(74) *Attorney, Agent, or Firm* — Withrow & Terranova, PLLC

(57) ABSTRACT

A method in a first user equipment for adjusting a beacon signal to be detected by at least one second user equipment in a wireless telecommunications network is provided. The beacon signal is transmitted in order to enable an establishment of Device-to-Device, D2D, communication between the first user equipment and the at least one second user equipment. The method is characterized in that the method comprises adjusting, prior to transmitting the beacon signal, the transmit power of the beacon signal based on a requirement of an application in the first user equipment for which the D2D communication is to be established.

(Continued)

A user equipment, a network node, and a method in a network node for enabling a D2D communication between a first user equipment and at least one second user equipment are also provided.

16 Claims, 5 Drawing Sheets

(58) Field of Classification Search
CPC ... H04W 72/085; H04W 16/14; H04W 28/22; H04W 52/243; H04W 52/245; H04W 28/18; H04W 52/04; H04W 52/18; H04W 52/265; H04L 5/0053; H04L 5/0035; H04L 5/0048; H04M 1/72505; H04M 1/72

See application file for complete search history.

(56) References Cited

U.S. PATENT DOCUMENTS

| | | | | |
|---|---|---|---|---|
| 8,081,575 | B2* | 12/2011 | Habetha | H04W 28/22 370/252 |
| 8,804,590 | B2* | 8/2014 | Nakae | H04W 48/12 370/311 |
| 9,319,931 | B2* | 4/2016 | Lim | H04W 72/085 |
| 2003/0100343 | A1* | 5/2003 | Zourntos | H04W 52/241 455/562.1 |
| 2005/0247775 | A1* | 11/2005 | Gloekler | G01S 19/42 235/375 |
| 2006/0253736 | A1* | 11/2006 | Rudolf | H04W 52/46 714/12 |
| 2007/0049317 | A1* | 3/2007 | Qi | H04W 52/54 455/522 |
| 2007/0147317 | A1* | 6/2007 | Smith | H04W 48/18 370/338 |
| 2007/0274275 | A1* | 11/2007 | Laroia | H04W 40/244 370/338 |
| 2008/0069033 | A1* | 3/2008 | Li | H04W 48/16 370/328 |
| 2008/0137577 | A1* | 6/2008 | Habetha | H04W 28/22 370/311 |
| 2008/0205340 | A1 | 8/2008 | Meylan et al. | |
| 2009/0017861 | A1* | 1/2009 | Wu | H04W 52/246 455/522 |
| 2009/0203388 | A1* | 8/2009 | Karaoguz | H04W 4/02 455/456.3 |
| 2009/0323648 | A1* | 12/2009 | Park | H04W 8/005 370/338 |
| 2010/0093364 | A1 | 4/2010 | Ribeiro et al. | |
| 2010/0202400 | A1 | 8/2010 | Richardson et al. | |
| 2011/0170431 | A1* | 7/2011 | Palanki | H04W 52/245 370/252 |
| 2011/0176523 | A1* | 7/2011 | Huang | G01S 5/02 370/338 |
| 2011/0258313 | A1 | 10/2011 | Mallik et al. | |
| 2011/0268101 | A1* | 11/2011 | Wang | H04L 5/0053 370/344 |
| 2011/0317569 | A1 | 12/2011 | Kneckt et al. | |
| 2012/0163263 | A1* | 6/2012 | Oh | H04W 52/0216 370/311 |
| 2012/0207100 | A1* | 8/2012 | Hakola | H04W 76/023 370/329 |
| 2012/0213075 | A1* | 8/2012 | Koie | H04L 47/2441 370/235 |
| 2012/0250636 | A1 | 10/2012 | Wang et al. | |
| 2012/0265818 | A1 | 10/2012 | Van Phan et al. | |
| 2013/0028177 | A1* | 1/2013 | Koskela | H04W 4/005 370/328 |
| 2013/0059583 | A1 | 3/2013 | Van Phan et al. | |
| 2013/0083661 | A1* | 4/2013 | Gupta | H04W 28/0215 370/235 |
| 2013/0115967 | A1* | 5/2013 | Soliman | H04W 16/02 455/452.1 |
| 2013/0163491 | A1* | 6/2013 | Singh | H04W 52/0216 370/311 |
| 2013/0170470 | A1 | 7/2013 | Kneckt et al. | |
| 2013/0178221 | A1* | 7/2013 | Jung | H04L 9/0844 455/450 |
| 2013/0195026 | A1* | 8/2013 | Johnsson | H04W 72/0493 370/329 |
| 2013/0195036 | A1 | 8/2013 | Quan et al. | |
| 2013/0212219 | A1* | 8/2013 | Koskela | H04W 72/04 709/217 |
| 2013/0235813 | A1 | 9/2013 | Segev et al. | |
| 2013/0242840 | A1 | 9/2013 | Tolhuizen et al. | |
| 2013/0267269 | A1* | 10/2013 | Fang | H04W 52/10 455/522 |
| 2013/0279381 | A1* | 10/2013 | Sampath | H04W 48/08 370/311 |
| 2013/0316762 | A1* | 11/2013 | Charbit | H04W 76/023 455/552.1 |
| 2014/0066058 | A1 | 3/2014 | Yu et al. | |
| 2014/0171062 | A1 | 6/2014 | Fallgren et al. | |
| 2014/0215594 | A1 | 7/2014 | Lambert | |
| 2014/0219095 | A1* | 8/2014 | Lim | H04W 72/085 370/235 |
| 2014/0226639 | A1 | 8/2014 | Yi et al. | |
| 2014/0370904 | A1 | 12/2014 | Smith et al. | |
| 2015/0131571 | A1 | 5/2015 | Fodor et al. | |
| 2015/0237491 | A1 | 8/2015 | Selén et al. | |
| 2015/0237663 | A1* | 8/2015 | Wilhelmsson | H04W 76/023 455/450 |

FOREIGN PATENT DOCUMENTS

| | | |
|---|---|---|
| WO | 2011063845 A1 | 6/2011 |
| WO | 2011130630 A1 | 10/2011 |
| WO | 2012035367 A1 | 3/2012 |
| WO | 2012069956 A1 | 5/2012 |
| WO | 2014042568 A1 | 3/2014 |

OTHER PUBLICATIONS

Non-Final Office Action for U.S. Appl. No. 14/428,877, dated Jan. 12, 2016, 23 pages.
Fodor, G. et al., "Design Aspects of Network Assisted Device-to-Device Communications," IEEE Communications Magazine, Mar. 2012, pp. 170-177.
International Search Report and Written Opinion for International Application No. PCT/SE2012/050983, dated Mar. 12, 2013, 13 pages.
Final Office Action for U.S. Appl. No. 14/408,200, dated Aug. 9, 2016, 34 pages.
Final Office Action for U.S. Appl. No. 14/428,877, dated Jun. 22, 2016, 33 pages.
Advisory Action for U.S. Appl. No. 14/428,877, dated Sep. 1, 2016, 2 pages.
Author Unknown, "A New Regulatory and Technical Environment for Wireless Broadband: A Primer on the IEEE 802.11y Amendment," Wi-Fi Alliance Discussion Paper, www.wi-fidev.org/knowledge_center_overview.php?docid=4570, Oct. 2008, Wi-Fi Alliance, pp. 1-7.
Herrera, Moisés, et al., "Performance Study of Non-beaconed and Beacon-Enabled Modes in IEEE 802.15.4 Under Bluetooth Interference," The Second International Conference on Mobile Ubiquitous Computing, Systems, Services and Technologies (UBICOMM), Sep. 29-Oct. 4, 2008, IEEE Computer Society, pp. 144-149.
Eljack, Sarah et al., "Synchronized Multi-Channel Cognitive MAC protocol with Efficient Solutions for Second Spectrum Access," Symposia and Workshops on Ubiquitous, Autonomic and Trusted Computing, Jul. 7-9, 2009, IEEE, pp. 477-481.
Ke, Yi et al., "MCR-MAC: Multi-channel Cognitive Radio MAC Protocol for Cooperative Incumbent System Protection in Wireless Ad-hoc Network," First International Conference on Ubiquitous and Future Networks, Jun. 7-9, 2009, Hong Kong, China, IEEE, pp. 6-11.

(56) References Cited

OTHER PUBLICATIONS

International Search Report and Written Opinion for PCT/SE2012/051144, dated Feb. 26, 2013, 13 pages.
International Search Report and Written Opinion for PCT/SE2012/050981, dated Jun. 14, 2013, 12 pages.
Baccelli, Francois, et al., "On the Design of Device-to-Device Autonomous Discovery," Fourth International Conference on Communication Systems and Networks (COMSNETS), Jan. 3-7, 2012, Bangalore, India, IEEE, 9 pages.
Doppler, Klaus, et al., "Advances in D2D Communications: Energy efficient Service and Device Discovery Radio," 2nd International Conference on Wireless Communication, Vehicular Technology, Information Theory and Aerospace & Electronic Systems Technology (Wireless VITAE), Feb. 28-Mar. 3, 2011, Chennai, India, IEEE, 6 pages.
Doppler, Klaus, et al., "Device-to-Device Communication as an Underlay to LTE-Advanced Networks," IEEE Communications Magazine, vol. 47, Issue 12, Dec. 2009, IEEE, pp. 42-49.
Drula, Catalin, et al., "Adaptive Energy Conserving Algorithms for Neighbor Discovery in Opportunistic Bluetooth Networks," IEEE Journal on Selected Areas in Communication, vol. 25, Issue 1, Jan. 2007, IEEE, pp. 96-107.
Zhang, Lei, et al., "Neighbor Discovery in Wireless Networks Using Compressed Sensing with Reed-Muller Codes," International Symposium of Modeling and Optimization of Mobile, Ad Hoc, and Wireless Networks, May 9-13, 2011, Princeton, New Jersey, IEEE, pp. 154-160.
Corrected Notice of Allowability for U.S. Appl. No. 14/408,200, dated Mar. 28, 2017, 14 pages.
Notice of Allowance for U.S. Appl. No. 14/428,877, dated Feb. 17, 2017, 5 pages.
Corrected Notice of Allowability for U.S. Appl. No. 14/408,200, dated Apr. 25, 2017, 13 pages.
Notice of Allowability for U.S. Appl. No. 14/408,200, dated Jul. 12, 2017, 10 pages.

\* cited by examiner

USER EQUIPMENT, A NETWORK NODE, AND METHODS FOR DEVICE DISCOVERY IN DEVICE TO-DEVICE (D2D) COMMUNICATIONS IN A WIRELESS TELECOMMUNICATIONS NETWORK

This application is a 35 U.S.C. §371 national phase filing of International Application No. PCT/SE2012/050983, filed Sep. 18, 2012, the disclosure of which is incorporated herein by reference in its entirety.

TECHNICAL FIELD

Embodiments herein relate to Device-to-Device (D2D) communications in a wireless telecommunications network. In particular, embodiments herein relate to device discovery in a D2D-communication in a wireless telecommunications network.

BACKGROUND

Communication devices such as User Equipments (UE) are also known as e.g. mobile terminals, wireless terminals and/or mobile stations. User equipments are enabled to communicate wirelessly in a wireless communications system, wherein the wireless communications system sometimes also may be referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the wireless communications system.

User equipments may further be referred to as mobile telephones, cellular telephones, or laptops with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another user equipment or a server.

The wireless communications system covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP GSM EDGE Radio Access Network (GERAN), a user equipment has a multi-slot class, which determines the maximum transfer rate in the uplink and downlink direction. EDGE is an abbreviation for Enhanced Data rates for GSM Evolution.

In the context of this disclosure, the expression Downlink (DL) is used for the transmission path from the base station to the mobile station. The expression Uplink (UL) is used for the transmission path in the opposite direction i.e. from the mobile station to the base station.

In D2D communications user equipments that are in the proximity of each other may discover one another. Note that proximity may here well mean over hundreds of meters. This is referred to as D2D device discovery. In D2D device discovery user equipments may by receiving a beacon signal from another user equipment discover that it is in the proximity of the other user equipment. This may be performed without any direct interaction by the radio access network.

However, there may very well be an indirect radio access network involvement, such as, e.g. the network may inform a first user equipment how to transmit the beacon signal and/or inform a second user equipment about how the beacon signal is transmitted, which would simplify the detection of the beacon signal by the second user equipment. In this type of network assisted D2D device discovery, the radio access network may e.g. allocate resources for the beacon signal so that transmitting and receiving user equipments know what time and frequency resources are being used for D2D device discovery. In other words, when and at what frequencies the beacon signal should be transmitted and scanned for.

It should be noted that the beacon signal transmitted by the first user equipment is typically not only intended for the second user equipment. Multiple user equipments may detect the beacon signal and thus conclude whether or not they are in the proximity of the first user equipment.

Once the user equipments discover the proximity of each other, the user equipments and/or the network may initiate the establishment of the D2D link between the two user equipments. This is commonly referred to as D2D bearer establishment and is not described in any further detail hereinafter.

Typically, the beacon signal is very robust in the sense that the beacon signal may be properly decoded even at poor channel conditions. While this is a preferred property of the beacon signal, it has been noted to cause problems for the actual data transfer of the D2D communication over the subsequent established D2D link.

SUMMARY

It is an object of embodiments herein to improve the signalling between user equipments in a D2D-communication in a wireless telecommunications network.

According to a first aspect of embodiments herein, the object is achieved by a method in a first user equipment for adjusting a beacon signal to be detected by at least one second user equipment in a wireless telecommunications network. The beacon signal is transmitted in order to enable an establishment of Device-to-Device, D2D, communication between the first user equipment and the at least one second user equipment. The first user equipment adjusts, prior to transmitting the beacon signal, the transmit power of the beacon signal based on a requirement of an application in the first user equipment for which the D2D communication is to be established.

According to a second aspect of embodiments herein, the object is achieved by a user equipment for adjusting a beacon signal to be detected by at least one second user equipment in a wireless telecommunications network. The beacon signal is transmitted in order to enable an establishment of D2D communication between the first user equipment and the at least one second user equipment. The user equipment comprises an adjustment unit configured to adjust, prior to the transmission of the beacon signal, the transmit power of the beacon signal based on a requirement of an application in the user equipment for which the D2D communication is to be established.

According to a third aspect of embodiments herein, the object is achieved by a method in network node for enabling D2D communication between a first user equipment and at least one second user equipment. The first user equipment is configured to transmit a beacon signal to be detected by the at least one second user equipment. The network node receives information from the first user equipment indicating an application in the first user equipment for which a D2D communication is to be enabled. Then, the network node determines an adjustment of the transmit power of the beacon signal to be transmitted by the first user equipment based on a requirement of the indicated application in the received information. Further, the network node transmits information about the determined adjustment to the first user equipment to enable D2D communication. The determined adjustment is to be used by the first user equipment when adjusting the transmit power of the beacon signal prior to transmitting the beacon signal.

According to a fourth aspect of embodiments herein, the object is achieved by a network node for enabling a D2D communication between a first user equipment and at least one second user equipment. The first user equipment is configured to transmit a beacon signal to be detected by the at least one second user equipment. The network node comprises a transceiving unit configured to receive information from the first user equipment indicating an application in the first user equipment for which a D2D communication is to be enabled. Also, the network node comprises a determining unit configured to determine an adjustment of the transmit power of the beacon signal to be transmitted by the first user equipment based on a requirement of the indicated application in the received information. Further, the transceiving unit is further configured to transmit information about the determined adjustment to the first user equipment to enable D2D communication. The determined adjustment is to be used by the first user equipment when adjusting the transmit power of the beacon signal prior to transmitting the beacon signal.

Sometimes when a D2D link has been enabled by a robust beacon signal at poor channel conditions, the actual data transfer by an application in the D2D communication over the D2D link may not cope so well with these poor channel conditions. In this aspect, a large transmit power of the robust beacon signal may therefore have a negative impact on a subsequent D2D communication.

Thus, by adjusting the transmit power of the beacon signal based on the requirement of the application that is targeted for D2D communication over the subsequent D2D link, the probability of establishing a D2D link that will turn out to be useless, or of limited use, for the D2D communication is reduced. For example, the more demanding the application, the lesser the transmit power of the beacon signal may be adjusted.

In this way, since the establishment of useless or limited D2D links for D2D communications is reduced, the signalling is improved between the user equipments in D2D communication in the wireless telecommunications network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
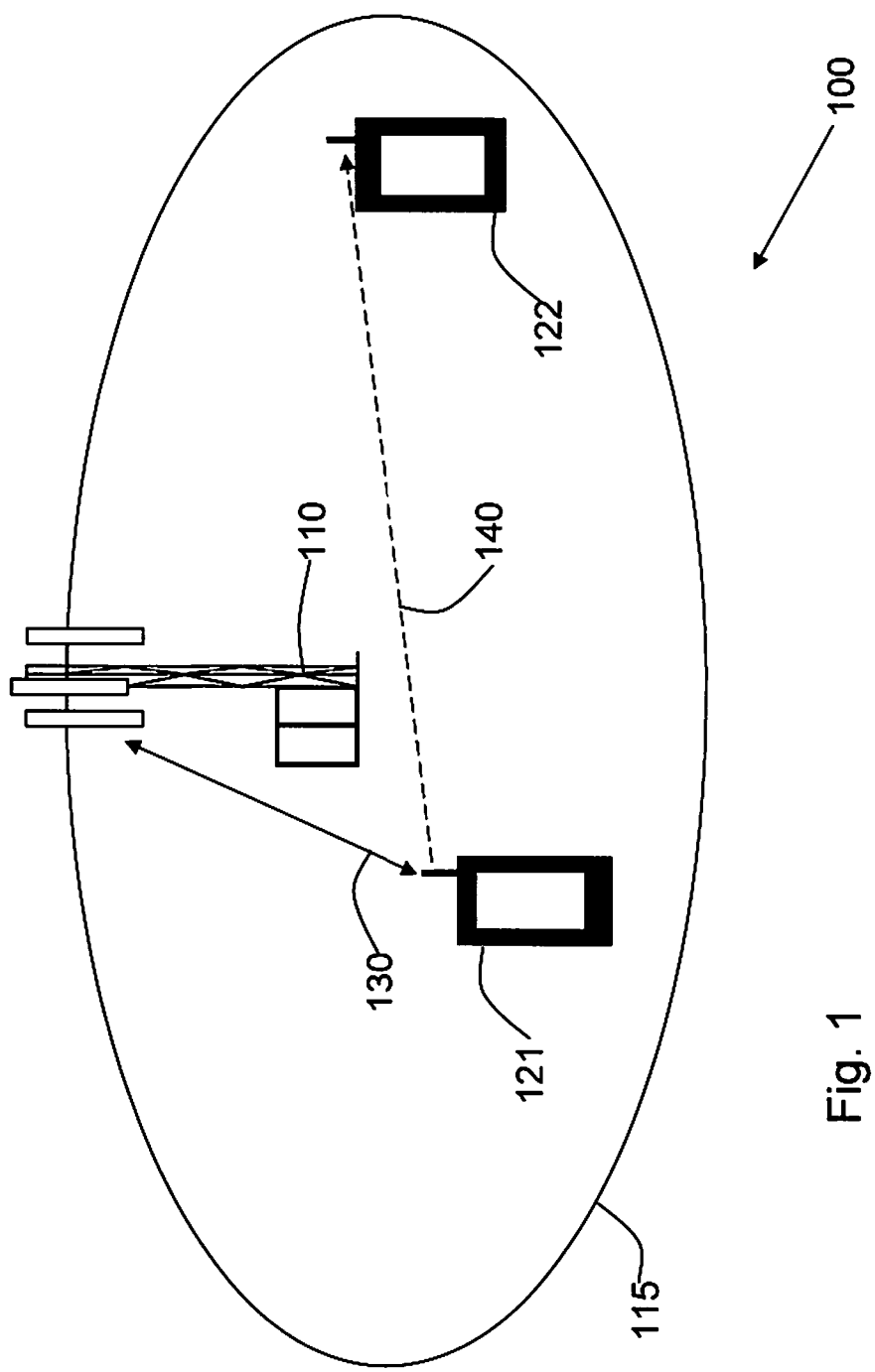
FIG. 1 is a schematic block diagram illustrating embodiments in a wireless communications network.

The figures are schematic and simplified for clarity, and they merely show details which are essential to the understanding of the embodiments presented herein, while other details have been left out. Throughout, the same reference numerals are used for identical or corresponding parts or steps.

According to embodiments herein, a new type of beacon adjustment is introduced that adapts the transmit power of the beacon signal, prior to transmission thereof, to the requirement of the targeted application for a D2D communication in a user equipment.

FIG. 1 depicts a communications network 100 in which embodiments herein may be implemented. In some embodiments the communications network 100 may be a wireless communication network such as an LTE (e.g. LTE FDD, LTE TDD, LTE HD-FDD), WCDMA, UTRA TDD, GSM network, GERAN network, enhanced data rate for GSM evolution (EDGE) network, network comprising of any combination of RATs such as e.g. Multi-Standard Radio (MSR) base stations, multi-RAT base stations etc., any 3GPP cellular network, Wimax, or any cellular network or system.

A number of user equipments are located in the communications network 100. The user equipments may also be referred to as wireless devices. In the example scenario of FIG. 1, only two user equipments are shown. One of them is a first user equipment 121. Further, one or more second user equipments 122 are located in the cellular communications network 100, whereof one second user equipment 122 is shown in FIG. 1.

The first user equipment 121 and the second user equipment 122 are located in a cell 115 served by the network node 110. The network node 110 may be referred to as a base station. The network nodes 110 may e.g. be an eNB, an eNodeB, or a Home Node B, a Home eNode B, a femto Base Station (BS), a pico BS or any other network unit capable to serve a user equipment or a machine type communication device which are located in the cell 130 in the wireless telecommunications network 100. The network node 110 may also be connected to a core network node (not shown) in the wireless communications network 100.

The first user equipment 121 and the second user equipment 122 are both capable to communicate using D2D communication. The first user equipment 121 may e.g. communicate with the second user equipment 122 using D2D communication over a D2D link.

The first user equipment 121 and the second user equipment 122 may e.g. be mobile terminals or wireless terminals, mobile phones, computers such as e.g. laptops, Personal Digital Assistants (PDAs) or tablet computers.

In D2D communication user equipments need to find each other in order to be able to communicate. This can be done either with network support, e.g. via network signaling 130, or purely based on communications between the user equipments as exemplified in some of the embodiments herein.

User equipments such as the first user equipment 121 and the second user equipment 122 in FIG. 1, attempt to discover user equipments in a local range for e.g. communication or that can provide a given type of service. The first user equipment 121 may make use of some D2D technology and broadcasts a beacon signal 140 over a beacon channel, which may be received by a peer such as the second user equipment 122, thereby enabling D2D device discovery. There may be multiple D2D technologies in operation which may carry a beacon signal 140. Possible options comprise 802.11 WLAN, Bluetooth, or a possible future D2D extension of LTE, or other technologies, such as, wireless sensor technology.

Typically, the properties of a beacon signal in D2D device discovery, such as, e.g. the used transmit power, are the same regardless of what kind of application in the user equipment it is that is targeted for D2D communication over the subsequent D2D link.

Furthermore, although it is preferred that the beacon signal is more robust than the subsequent actual data transfer, it has been found that if the difference between these two is too large, it might have a negative impact on both the performance for the user equipment as well as for the network. This is because a D2D link may be established which later will be found to be much too bad for the D2D communication of the targeted application.

According to one example, assume that the beacon signal is so robust that it can be correctly received by the second user equipment 122 at a signal level of −110 dBm. However, one application in the first user equipment 121 using 1 Mbps in its data transfer might require a signal level of −100 dBm, another application in the first user equipment 121 using 10 Mbps in its data transfer might require a signal level of −90 dBm, and a further application in the first user equipment 121 using 100 Mbps in its data transfer might require a signal level of −80 dBm.

Now, suppose the beacon signal is transmitted at the same power as the actual data transfer for the intended application and also suppose that the power of the received signal is −95 dBm, for either beacon signal and/or actual application data. This means that, for the beacon signal, this is received with a margin of 15 dBm, and clearly the D2D device discovery will be successful.

However, in case the intended application uses a data rate of 10 Mbps or 100 Mbps, this means that the received signal is 5 dBm or 15 dBm, respectively, too weak for this communication link to be functional.

Therefore, in this case, if the same transmit power is used for both the beacon signal and the actual data transfer, the D2D link will be established but then found to be useless for the actual application and thus all communication has been a waste of resources.

Thus, according to the embodiments herein, by providing a new type of beacon adjustment that adapts the transmit power of the beacon signal to the requirement of a targeted application for a D2D communication in a user equipment, an improved signaling between user equipments 121, 122 in a D2D-communication in a wireless telecommunications network 100 is achieved.

Figure 2:
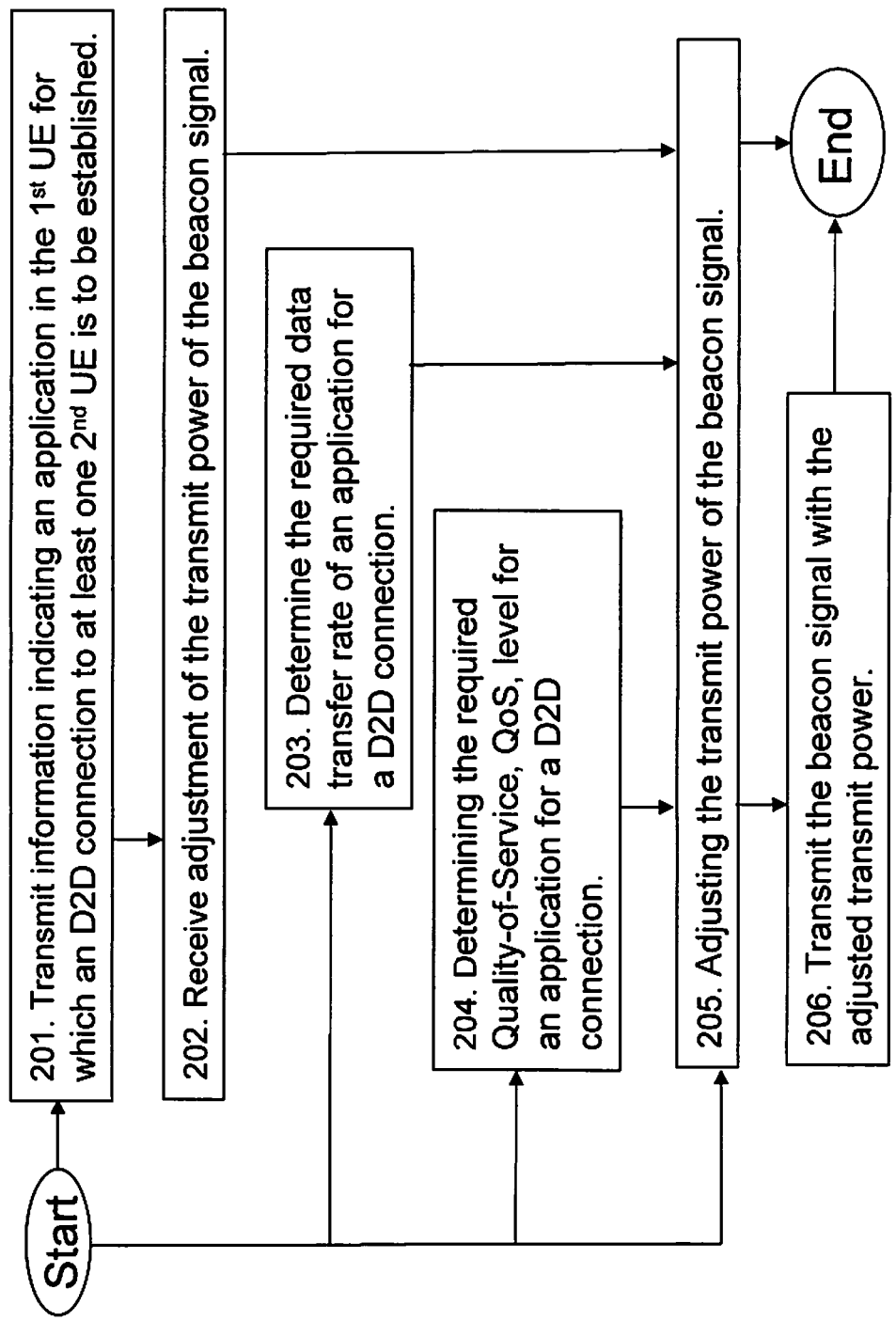
FIG. 2 is a flowchart depicting embodiments of a method in a user equipment.

Example of embodiments of a method in a first user equipment 121 for adjusting a beacon signal 140 to be detected by at least one second user equipment 122 in a wireless telecommunications network 100, will now be described with reference to a flowchart depicted in FIG. 2. Here, the method is discussed seen from the perspective of the first device 121. In an example scenario, the first user equipment 121 wishes to discover a user equipment such as the second user equipment 122 for D2D communication. Therefore, the first user equipment 121 intend to send a beacon signal 140 that is to be discovered by the second user equipment 122 and allows the second user equipment 122 to find the first user equipment 121. Thus, the beacon signal 140 is transmitted in order to enable an establishment of D2D communication between the first user equipment 121 and the at least one second user equipment 122.

The method comprises the following actions, which actions may be taken in any suitable order.

Action 201

In some embodiments, when network assisted D2D device discovery is used, the first user equipment 121 may transmit information to the network node 110 indicating the application in the first user equipment 121 for which a D2D communication with the second user equipment 122 is to be established. This is performed by the first user equipment 121 prior to transmitting the beacon signal 140. Thus, the network node 110 is informed that the first user equipment 121 desires to establish a D2D communication with a second user equipment 122 using a particular application, type of application or an application with a particular requirement.

An example of the information transmitted to the network node 110 by the first user equipment 121 indicating the application is a unique identifier of the application. Another example of the information is an indication of the type of the application. A further example of the information is a required data transfer rate of the application. Also, another further example of the information is a required Quality-of-Service, QoS, level for the application.

Action 202

In response to transmitting the information to the network node 110 in Action 201, the first user equipment 121 may receive information about an adjustment of the transmit power of the beacon signal 140 from the network node 110. This is also performed by the first user equipment 121 prior to transmitting the beacon signal 140.

In this way, the network node 110 may inform the first user equipment 121 of a suitable adjustment of the power of its beacon signal 140 for a D2D communication targeting the indicated application.

Action 203

Alternatively, in some embodiments, the first user equipment 121 may determine a required data transfer rate of the application in the user equipment 121 for which a D2D communication is to be established. Normally for an application in a user equipment its required data transfer rate is known, e.g. in case a video stream of a certain quality is to be transmitted, then the required data transfer rate is easy to know or to calculate.

Action 204

Optionally, in some embodiment, the first user equipment 121 may determine a required Quality-of-Service, QoS, level for the application in the user equipment 121 for which a D2D communication is to be established. For example, a real-time application may have certain known delay constraints.

According to one example, the required Quality-of-Service, QoS, level for the application may be determined based on whether the application is of a first type of applications or is of a second type of applications. The first type of applications may be real-time applications or delay-sensitive applications, such as, e.g. voice and/or video applications, and the second type of applications may be non-real-time applications or non-delay-sensitive applications, such as, e.g. file transfer applications.

Action 205

In this action, the first user equipment 121 adjusts the transmit power of the beacon signal 140 based on a requirement of an application in the first user equipment 121 for which the D2D communication is to be established. This is performed by the first user equipment 121 prior to transmitting the beacon signal 140.

In some embodiments, the adjustment may be performed based on received information about an adjustment of the transmit power of the beacon signal 140 from the network node 110, as described above in Actions 201-202. In this case, the first user equipment 121 may adjust the transmit power of its beacon signal 140 from a default transmit power level to a higher or lower transmit power level as indicated by the received information.

The transmit power level to adjust to may be indicated in the information from the network node 110 by, for example, an actual transmit power value. According to another example, this may also be performed by a message or indicator indicating the actual transmit power value to be used in the first user equipment 121.

In some embodiments, the adjustment may be performed based on a required data transfer rate of the application, as determined above in Action 203. In this case, the first user equipment 121 may adjust the transmit power of its beacon signal 140 from a default transmit power level to a higher or lower transmit power level as indicated by the determined required data transfer rate of the application.

For example, a high required data transfer rate of the application may indicate that a transmit power level that is lower than, or equal to, the default transmit power level for the beacon signal 140 should be used for transmit power of the beacon signal 140. Correspondingly, a low required data transfer rate of the application may indicate that a transmit power level that is higher than, or equal to, the default transmit power level for the beacon signal 140 should be used for transmit power of the beacon signal 140.

According to another example, the default transmit power level may be the maximum power output value, wherein only adjustments to lower transmit power levels may be performed based on the required data transfer rate of the application.

In some embodiments, the adjustment may be performed based on a required QoS level of the application, as determined above in Action 204. In this case, the first user equipment 121 may adjust the transmit power of its beacon signal 140 from a default transmit power level to a higher or lower transmit power level as indicated by the determined required QoS level of the application.

For example, if the application is of a first type, as indicated in Action 204, then a transmit power level that is lower than, or equal to, the default transmit power level for the beacon signal 140 should be used for transmit power of the beacon signal 140. Corresponding, if the application is of a second type, as indicated in Action 204, then a transmit power level that is higher than, or equal to, the default transmit power level for the beacon signal 140 should be used for transmit power of the beacon signal 140.

According to another example, the default transmit power level may be the maximum power output value, wherein only adjustments to lower transmit power levels may be performed based on the required QoS level of the application.

In some embodiments, information linking the application, the required data transfer rate of the application and/or the required QoS level of the application to a particular transmit power level of the beacon signal 140 may be accessed e.g. in a look-up table or in another type of data storage in the user equipment 121.

In this way, a beacon signal 140 with an adjusted transmit power is obtained that reduces the risk of establishing D2D communication over D2D links between user equipments, which later may turn out to be useless for the targeted application.

Action 206

In this optional action, the first user equipment 121 may transmit the beacon signal 140 with the adjusted transmit power obtained in Action 205. In this way, the beacon signal 140 with the adjusted transmit power may be discovered by the second user equipment 122.

Figure 3:
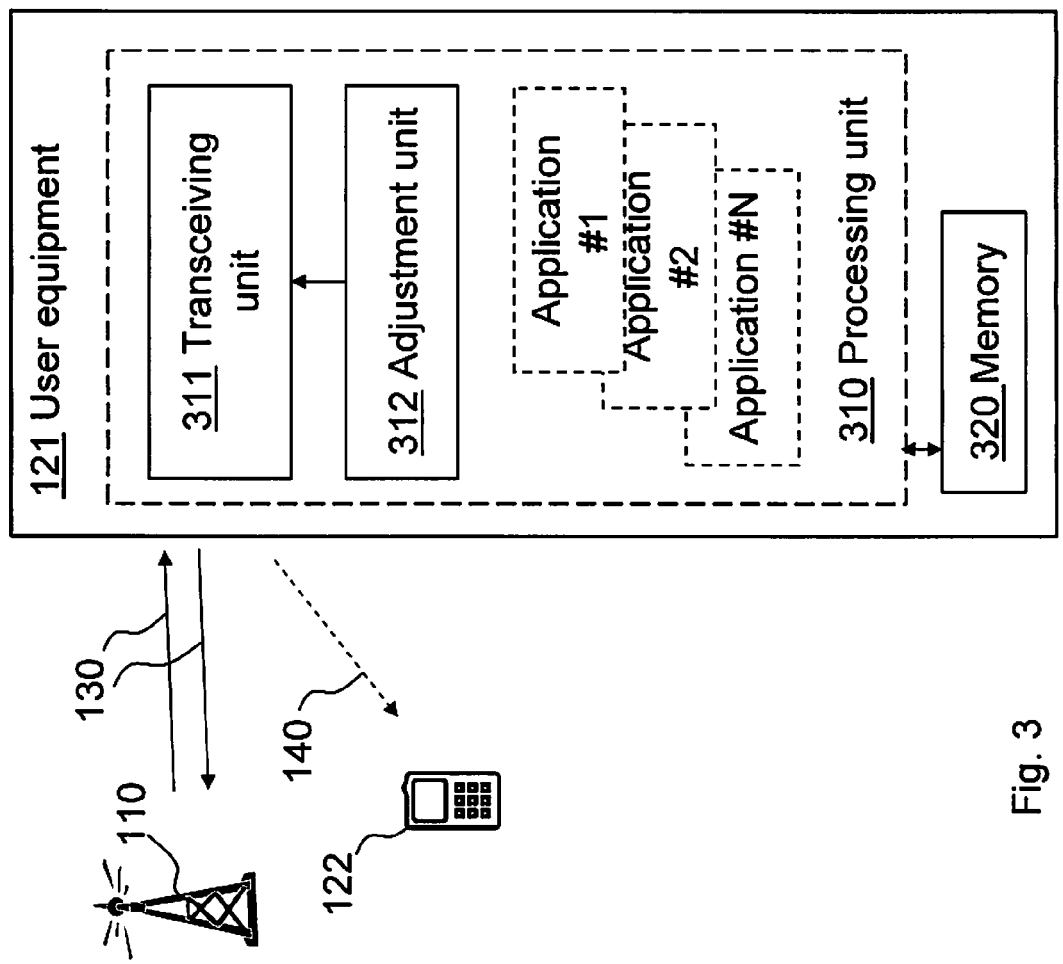
FIG. 3 is a block diagram depicting embodiments of a user equipment.

To perform the method actions for adjusting a beacon signal 140 to be detected by at least one second user equipment 122 in a wireless telecommunications network 100, the user equipment 121 comprises the following arrangement depicted in FIG. 3. FIG. 3 shows a schematic block diagram of embodiments of the user equipment 121.

As mentioned above, the user equipment 121 is configured to transmit the beacon signal 140 in order to enable an establishment of D2D communication between the first user equipment 121 and the at least one second user equipment 122.

The user equipment 121 comprises a processing unit 310, which may also be referred to as processing circuitry. The processing unit 310 is configured to run one or more applications, denoted Application #1, Application #2, . . . , Application #N. Here, N is any suitable integer.

Each application may comprise different requirements on the D2D communication. For example, a file transfer application for transferring e.g. an image or video file to the at least second user equipment 122 using D2D communication is usually not particularly delay-sensitive and may therefore have low requirements on the D2D communication. On the other hand, a voice and/or video application for streaming voice and/or video in real-time is usually very delay-sensitive and may therefore have high requirements on the D2D communication.

The processing unit 310 in the user equipment 121 may comprise, or be configured to be connected to, a transceiving unit 311 and an adjustment unit 312.

The transceiving unit 311 is configured to transmit the beacon signal 140 with the transmit power adjusted by the adjustment unit 312. In some embodiments, the transceiving unit 311 may also be configured to transmit information to a network node 110 indicating the application in the first user equipment 121 for which a D2D communication with the at least one second user equipment 122 is to be established. This transmission is performed prior to transmitting the beacon signal 140. Also, in these embodiments, the transceiving unit 311 may also be configured to receive information about an adjustment of the transmit power of the beacon signal 140 from the network node 110. This reception is also performed prior to transmitting the beacon signal 140. This received information about an adjustment may then be used by the adjustment unit 312 when adjusting the transmit power of the transmit power of the beacon signal 140.

In some embodiments, the information transmitted to the network node 110 indicating the application may e.g. be a unique identifier of the application or any indication of the type of application. Alternatively, the requirement of the application may be directly sent, e.g. in the form of a required data transfer rate of the application or a required Quality-of-Service, QoS, level for the application.

The adjustment unit 312 is configured to adjust the transmit power of the beacon signal 140 based on a requirement of an application in the user equipment 121 for which the D2D communication is to be established. This adjustment is performed prior to the transmission of the beacon signal 140.

In some embodiments, the adjustment unit 312 may be configured to determine the requirement of the application as a required data transfer rate of the application. In this case, the adjustment unit 312 may perform the adjustment based on the required data transfer rate of the application.

In some embodiments, the adjustment unit 312 may be configured to determine the requirement of the application as a required QoS level associated with the application. In this case, the adjustment unit 312 may perform the adjustment based on the required QoS level associated with the application. Here, the required QoS level for the application may be determined based on whether the application is of a first type of applications or of a second type of applications. The first type of applications may e.g. be real-time applications, and the second type of applications may e.g. be non-real-time applications.

The embodiments herein for adjusting a beacon signal 140 to be detected by at least one second user equipment 122 may be implemented through one or more processors, such as the processing unit 310 in the user equipment 121 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the user equipment 121. The computer program code may e.g. be provided as pure program code in the user equipment 121 or on a server and downloaded to the user equipment 121.

The user equipment 121 may further comprise a memory 320 comprising one or more memory units. The memory 320 may be arranged to be used to store data, such as, e.g. information regarding the applications in the user equipment 121, the requirements of the applications in the user equipment 121 and/or the transmit power to which the beacons signal 140 should be adjusted based on the requirement of the applications in the user equipment 121, to perform the methods herein when being executed in the user equipment 121.

Those skilled in the art will also appreciate that the processing unit 310 and the memory 320 described above may refer to a combination of analog and digital circuits, and/or one or more processors configured with software and/or firmware, e.g. stored in a memory, that when executed by the one or more processors such as the processing unit 310 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 4:
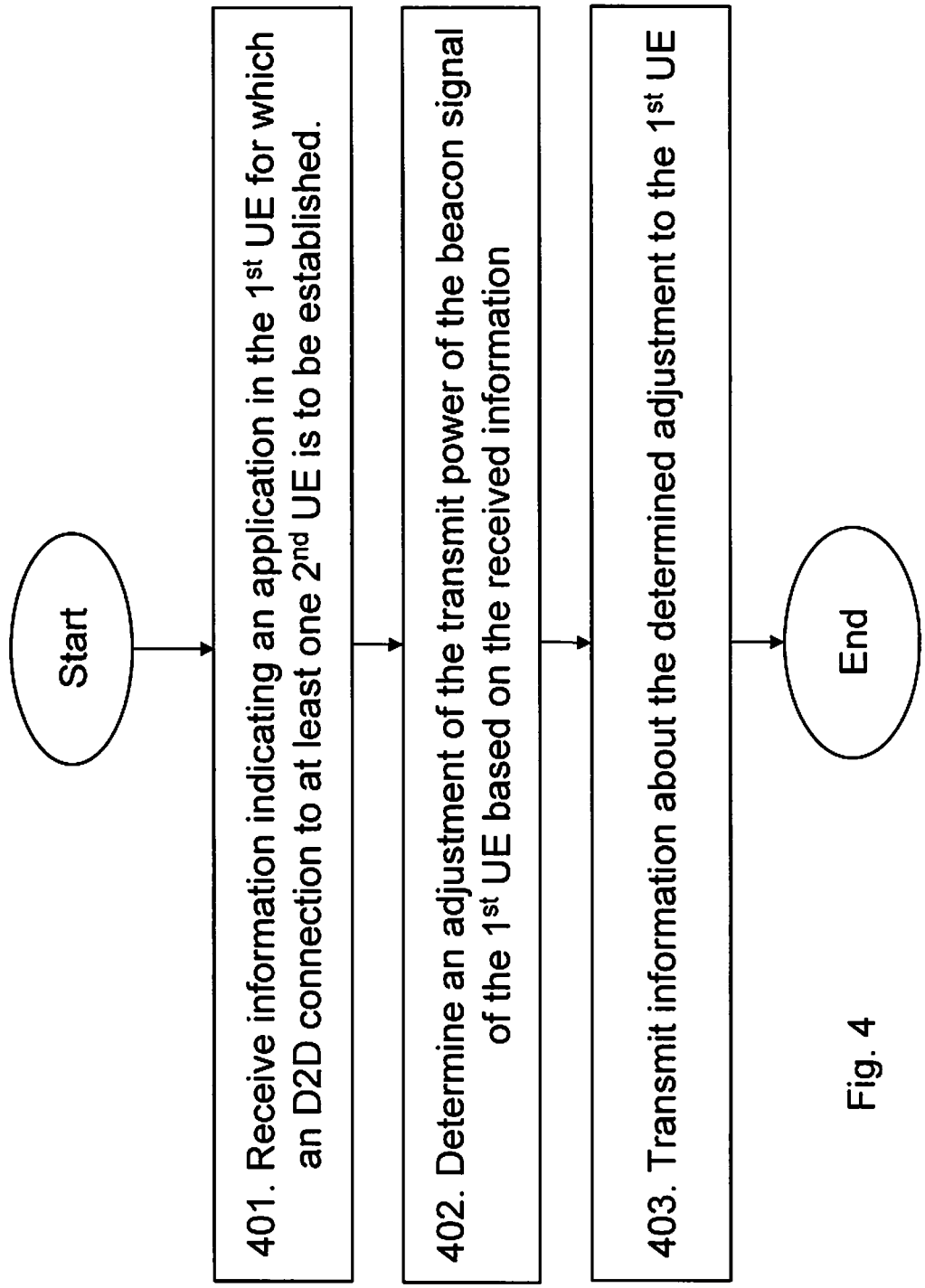
FIG. 4 is a flowchart depicting embodiments of a method in network node.

Example of embodiments of a method in a network node 110 for enabling D2D communication between a first user equipment 121 and at least one second user equipment 122, will now be described with reference to a flowchart depicted in FIG. 4. Here, the method is discussed seen from the perspective of the network node 110. In an example scenario, the first user equipment 121 wishes to discover a user equipment such as the second user equipment 122 for D2D communication. Therefore, the first user equipment 121 intend to send a beacon signal 140 that is to be discovered by the second user equipment 122 and assist the second user equipment 122 to find the first user equipment 121. Thus, the first user equipment 121 is configured to transmit a beacon signal 140 to be detected by the at least one second user equipment 122.

The method comprises the following actions, which actions may be taken in any suitable order. It should also be noted that the method described below may also be performed partly or completely by a core network node (not shown) in the wireless communications network 100 to which the network node 110 may be configured to be connected.

Action 401

As in this case, when network assisted D2D device discovery is used, the network node 110 may receive information from the first user equipment 121 indicating an application in the first user equipment 121 for which a D2D communication is to be enabled. Thus, the network node 110 is informed that the first user equipment 121 desires to establish a D2D communication with at least one second user equipment 122 using a particular application, type of application or an application with a particular requirement.

An example of the information received by the network node 110 from the first user equipment 121 indicating the application is a unique identifier of the application. Another example of the information is an indication of the type of the application. A further example of the information is a required data transfer rate of the application. Also, another further example of the information is a required Quality-of-Service, QoS, level for the application.

Action 402

In response to receiving the information indicating an application, the network node 110 determines an adjustment of the transmit power of the beacon signal 140 to be transmitted by the first user equipment 140 based on a requirement of the application indicated in the received information.

In some embodiments, the adjustment may be determined based on a required data transfer rate of the application, e.g. as received in Action 401. For example, a high required data transfer rate of the application may indicate that a transmit power level that is lower than, or equal to, the default transmit power level for the beacon signal 140 should be used for transmit power of the beacon signal 140. Correspondingly, a low required data transfer rate of the application may indicate that a transmit power level that is higher than, or equal to, the default transmit power level for the beacon signal 140 should be used for transmit power of the beacon signal 140. According to another example, the default transmit power level may be the maximum power output value, wherein only adjustments to lower transmit power levels may be determined by the network node 110.

In some embodiments, the adjustment may be determined based on a required QoS level of the application, e.g. as received in Action 401. For example, if the application is of a first type, as indicated in Action 204, then a transmit power level that is lower than, or equal to, the default transmit power level for the beacon signal 140 should be used for transmit power of the beacon signal 140. Correspondingly, if the application is of a second type, as indicated in Action 204, then a transmit power level that is higher than, or equal to, the default transmit power level for the beacon signal 140 should be used for transmit power of the beacon signal 140.

In this way, a beacon signal 140 with an adjusted transmit power is obtained that reduces the risk of establishing D2D communication over D2D links between user equipments, which later may turn out to be useless for the targeted application.

Furthermore, according to one example, the network node 110 may determine the adjustment by e.g. comprising information regarding the applications in the user equipment 121, the requirements of the applications in the user equipment 121 and/or the transmit power to which the beacons signal 140 should be adjusted based on the requirement of the applications in the user equipment 121. This information may be accessed e.g. in a look-up table or in another type of data storage in the network node 110 or via a core network node connected to the network node 110. In other words, the network node 110 may comprise or access information linking the application, the required data transfer rate of the application and/or the required QoS level of the application to a particular transmit power level of the beacon signal 140.

According to another example, the network node 110 may further determine the adjustment based on the channel conditions for one or more alternative communication links between the first user equipment 121 and the at least second user equipment 122 via the network node 110, such as, e.g. the ordinary radio link.

According to a further example, the network node 110 may further determine the adjustment based on an estimated interference condition for a D2D communication between the first user equipment 121 and the at least second user equipment 122. For example, in case the interference for the user equipments is particular severe, the power level of the beacon signal might be further reduced. One example is when the interference is bursty, then it might be that certain high QoS applications might not work properly and then you should reduce the beacon signal power even more in order not to set up a D2D link that is useless or of limited use.

According to yet a further example, both the channel conditions for one or more alternative communication links and an estimated interference condition for the D2D communication may be used by the network node 110 in determining the adjustment.

Action 403

After determining the adjustment, the network node 110 may transmit information about the determined adjustment to the first user equipment 121 to enable the D2D communication. The determined adjustment is to be used by the first user equipment 121 when adjusting the transmit power of the beacon signal 140 prior to transmitting the beacon signal 140. The transmit power level to adjust to may be indicated in the information from the network node 110 by e.g. an actual transmit power value. According to another example, this may also be performed by a message or indicator indicating the actual transmit power value to be used in the first user equipment 121.

In this way, the network node 110 may inform the first user equipment 121 of the suitable adjustment of the transmit power of its beacon signal 140 for the D2D communication targeting the indicated application.

Figure 5:
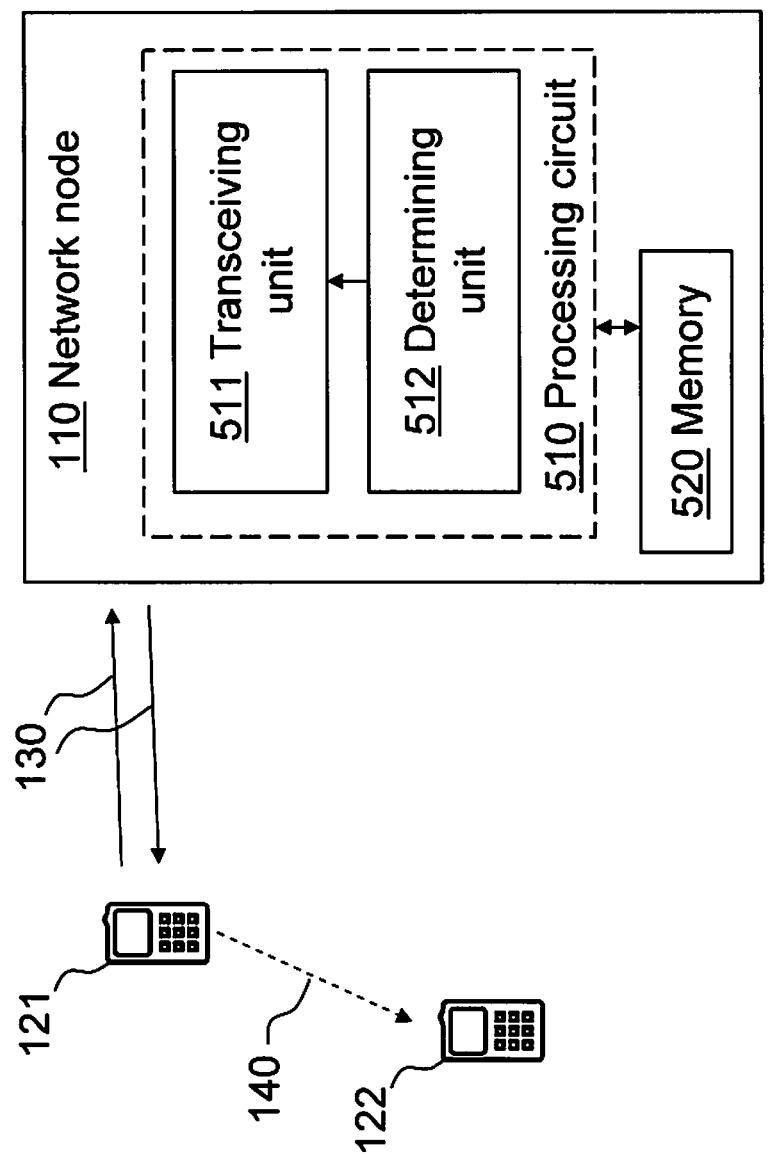
FIG. 5 is a block diagram depicting embodiments of a network node.

To perform the method for enabling a D2D communication between a first user equipment 121 and at least one second user equipment 122, the network node 110 comprises the following arrangement depicted in FIG. 5. FIG. 5 shows a schematic block diagram of embodiments of the network node 110. It should be noted that the network node 110 depicted in FIG. 5 may also be a core network node in the wireless communications network 100.

As mentioned above, the first user equipment 121 is configured to transmit a beacon signal 140 to be detected by the at least one second user equipment 122.

The network node 110 comprises a processing unit 510, which may also be referred to as processing circuitry. The processing unit 510 in the network node 110 may comprise, or be configured to be connected to, a transceiving unit 511 and a determining unit 512.

The transceiving unit 511 is configured to receive information from the first user equipment 121 indicating an application in the first user equipment 121 for which a D2D communication is to be enabled. The transceiving unit 511 is further configured to transmit information about a determined adjustment to the first user equipment 121 to enable the D2D communication. The determined adjustment is then to be used by the first user equipment 121 when adjusting the transmit power of the beacon signal 140 prior to transmitting the beacon signal 140.

The determining unit 512 is configured to determine an adjustment of the transmit power of the beacon signal 140 to be transmitted by the first user equipment 121 based on a requirement of the application indicated in the received information.

In some embodiments, the determining unit 512 is configured to determine the adjustment also based on the channel conditions for one or more alternative communication links between the first user equipment 121 and the at least second user equipment 122 via the network node 110.

In some embodiments, the determining unit 512 is further configured to determine the adjustment also based on an estimated interference condition for the D2D communication between the first user equipment 121 and the at least second user equipment 122.

In some embodiments, both the channel conditions for one or more alternative communication links and an estimated interference condition for the D2D communication may be used by the determining unit 512 in determining the adjustment.

The embodiments herein for enabling a D2D communication between a first user equipment 121 and at least one second user equipment 122 may be implemented through one or more processors, such as the processing unit 510 in the network node 110 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may e.g. be provided as pure program code in the network node 110 or on a server and downloaded to the network node 110.

The network node 110 may further comprise a memory 520 comprising one or more memory units. The memory 520 may be arranged to be used to store data, such as, e.g. information regarding the applications in the network node 110, the requirements of the applications in the network node 110 and/or the transmit power to which the beacons signal 140 should be adjusted based on the requirement of the applications in the user equipment 121, to perform the methods herein when being executed in the network node 110.

Those skilled in the art will also appreciate that the processing unit 510 and the memory 520 described above may refer to a combination of analog and digital circuits, and/or one or more processors configured with software and/or firmware, e.g. stored in a memory, that when executed by the one or more processors such as the processing unit 510 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The embodiments herein are not limited to the above described preferred embodiments. Various alternatives, modifications and equivalents may be used. Therefore, the above embodiments should not be construed as limiting.

The invention claimed is:

1. A method in a first user equipment for adjusting a beacon signal to be detected by at least one second user equipment in a wireless telecommunications network, which beacon signal is transmitted in order to enable an establishment of Device-to-Device, D2D, communication between the first user equipment and the at least one second user equipment, characterized in that the method comprises
   determining a requirement of an application in the first user equipment for which the D2D communication is to be established; and
   adjusting, prior to transmitting the beacon signal, the transmit power of the beacon signal based on the requirement,
   wherein the requirement comprises a required data transfer rate of the application.

2. The method according to claim 1, further comprising transmitting the beacon signal with the adjusted transmit power.

3. The method according to claim 1, further comprising determining the requirement as a required Quality-of-Service, QoS, level for the application, and wherein the adjusting is based on the required Quality-of-Service, QoS, level for the application.

4. The method according to claim 3, wherein the required Quality-of-Service, QoS, level for the application is determined based on whether the application is of a first type of applications or is of a second type of applications, wherein the first type of applications are real-time applications and the second type of applications are non-real-time applications.

5. The method according to claim 1, further comprising
   prior to transmitting the beacon signal, transmitting information to a network node indicating the application in the first user equipment for which a D2D communication with the at least one second user equipment is to be established, and
   receiving information about an adjustment of the transmit power of the beacon signal from the network node, prior to transmitting the beacon signal, which adjustment is to be used in the adjusting.

6. The method according to claim 5, wherein the information transmitted to the network node indicating the application comprises one or more of: a unique identifier of the application, an indication of the type of application, a required data transfer rate of the application, and a required Quality-of-Service, QoS, level for the application.

7. A user equipment for adjusting a beacon signal to be detected by at least one second user equipment in a wireless telecommunications network, which beacon signal is transmitted in order to enable an establishment of Device-to-Device, D2D, communication between the first user equipment and the at least one second user equipment,
   characterized in that the user equipment comprises
      an adjustment circuit configured to adjust, prior to the transmission of the beacon signal, the transmit power of the beacon signal based on a requirement of an application in the user equipment for which the D2D communication is to be established wherein the adjustment circuit is further configured to determine the requirement as a required data transfer rate of the application, and perform the adjustment based on the required data transfer rate of the application.

8. The user equipment according to claim 7, further comprising
   a transceiving circuit configured to transmit the beacon signal with the transmit power adjusted by the adjustment circuit.

9. The user equipment according to claim 7, wherein the adjustment circuit is further configured to determine the requirement as a required Quality-of-Service, QoS, level associated with the application, and perform the adjustment based on the required Quality-of-Service, QoS, level associated with the application.

10. The user equipment according to claim 9, wherein the required Quality-of-Service, QoS, level for the application is determined based on whether the application is of a first type of applications or of a second type of applications, wherein the first type of applications are real-time applications and the second type of applications are non-real-time applications.

11. The user equipment according to claim 7, wherein the transceiving circuit is further configured to, prior to transmitting the beacon signal, transmit information to a network node indicating the application in the first user equipment for which a D2D communication with the at least one second user equipment is to be established, and receive information about an adjustment of the transmit power of the beacon signal from the network node, and
   the adjustment circuit is further configured to use the received information when adjusting the transmit power of the transmit power of the beacon signal.

12. The user equipment according to claim 11, wherein the information transmitted to the network node indicating the application comprises one or more of: a unique identifier of the application, an indication of the type of application, a required data transfer rate of the application, and a required Quality-of-Service, QoS, level for the application.

13. A method in network node for enabling Device-to-Device, D2D, communication between a first user equipment and at least one second user equipment, which first user equipment is configured to transmit a beacon signal to be detected by the at least one second user equipment, characterized in that the method comprises receiving information from the first user equipment indicating an application in the first user equipment for which a D2D communication is to be enabled, determining an adjustment of the transmit power of the beacon signal to be transmitted by the first user equipment based on a requirement of the application indicated in the received information, the requirement comprising a required data transfer rate of the application, and transmitting information about the determined adjustment to the first user equipment to enable D2D communication, which determined adjustment is to be used by the first user equipment when adjusting the transmit power of the beacon signal prior to transmitting the beacon signal.

14. The method according to claim 13, wherein the determining is further based on channel conditions for one or more alternative communication links between the first user equipment and the at least second user equipment via the network node, and/or an estimated interference condition for a D2D communication between the first user equipment and the at least second user equipment.

15. A network node for enabling a Device-to-Device, D2D, communication between a first user equipment and at least one second user equipment, which first user equipment is configured to transmit a beacon signal to be detected by the at least one second user equipment, characterized in that the network node comprises a transceiving circuit configured to receive information from the first user equipment indicating an application in the first user equipment for which a D2D communication is to be enabled, and a determining circuit configured to determine an adjustment of the transmit power of the beacon signal to be transmitted by the first user equipment based on a requirement of the application indicated in the received information, the requirement comprising a required data transfer rate of the application, wherein the transceiving circuit is further configured to transmit information about the determined adjustment to the first user equipment to enable D2D communication, which determined adjustment is to be used by the first user equipment when adjusting the transmit power of the beacon signal prior to transmitting the beacon signal.

16. The network node according to claim 15, wherein the determining circuit is configured to determine the adjustment further based on channel conditions for one or more alternative communication links between the first user equipment and the at least second user equipment via the network node, and/or an estimated interference condition for a D2D communication between the first user equipment and the at least second user equipment.

* * * * *